M. O. TROY.
SYSTEM OF ELECTRICAL DISTRIBUTION.
APPLICATION FILED NOV. 11, 1905.

921,918.

Patented May 18, 1909.
3 SHEETS—SHEET 1.

Witnesses
J. Ellis Glen
Margaret E. Hooley

Inventor:
Matthew O. Troy.
by Albert G. Davis
Att'y.

M. O. TROY.
SYSTEM OF ELECTRICAL DISTRIBUTION.
APPLICATION FILED NOV. 11, 1905.

921,918.

Patented May 18, 1909.
3 SHEETS—SHEET 2.

Witnesses:
J. Ellis Glen
Margaret E. Hooley

Inventor:
Matthew O. Troy,
by Albert G. Davis
Att'y.

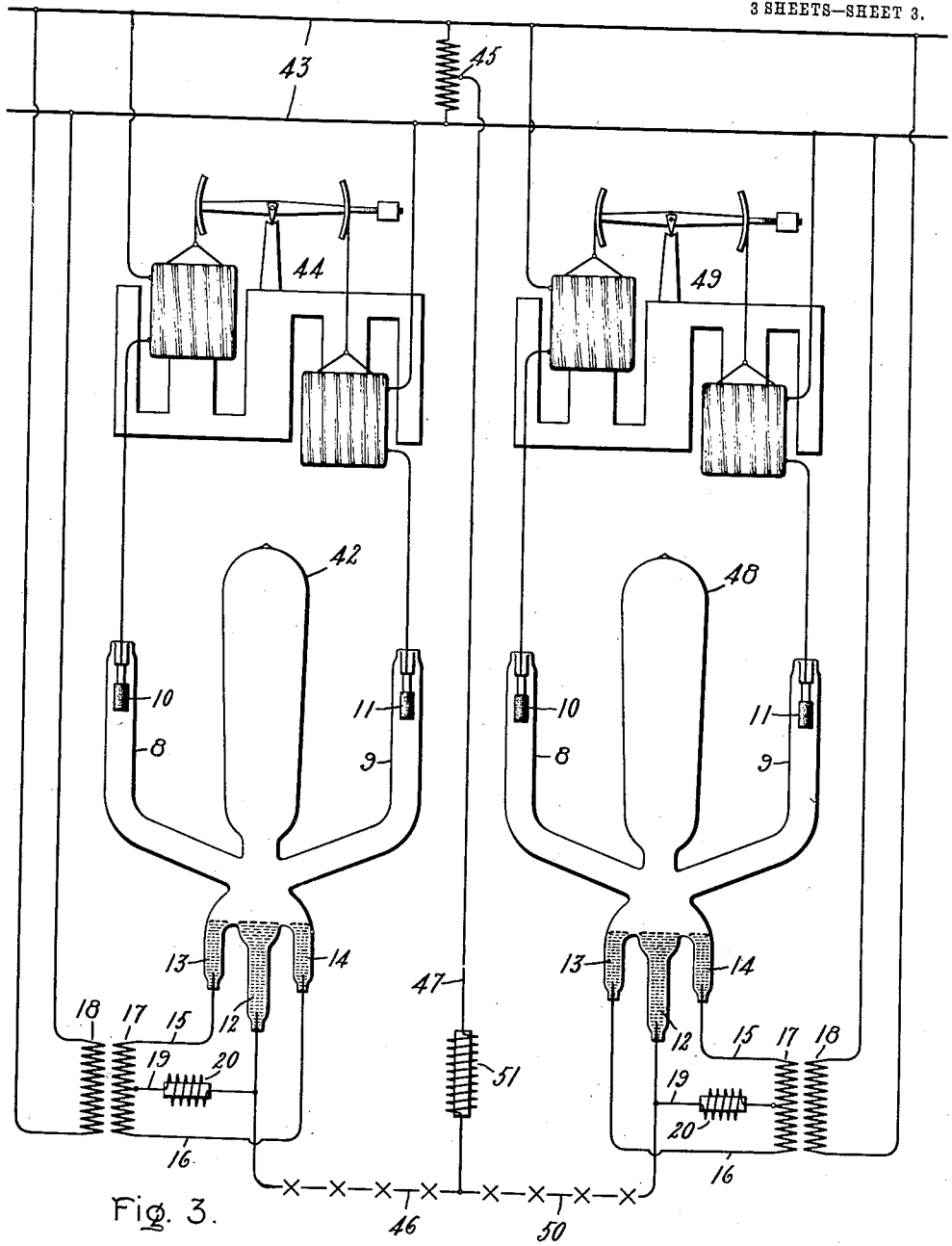

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 921,918.     Specification of Letters Patent.     Patented May 18, 1909.

Application filed November 11, 1905. Serial No. 286,828.

*To all whom it may concern:*

Be it known that I, MATTHEW O. TROY, a citizen of the United States, residing at Schenectady, county of Schenectady, State of New York, have invented certain new and useful Improvements in Systems of Electrical Distribution, of which the following is a specification.

My present invention relates to systems of current transformation in which alternating current is changed into direct current and fed to a suitable distribution circuit.

My invention is more particularly embodied in an arrangement whereby alternating current of constant potential may be changed into alternating current of constant volume and then rectified by a vapor electric apparatus or similar means and fed to a consumption circuit.

The features of novelty which characterize my invention are pointed out with particularity in the appended claims. The invention itself, however, will be better understood by reference to the following description taken in connection with the accompanying drawings, in which—

Figure 1:
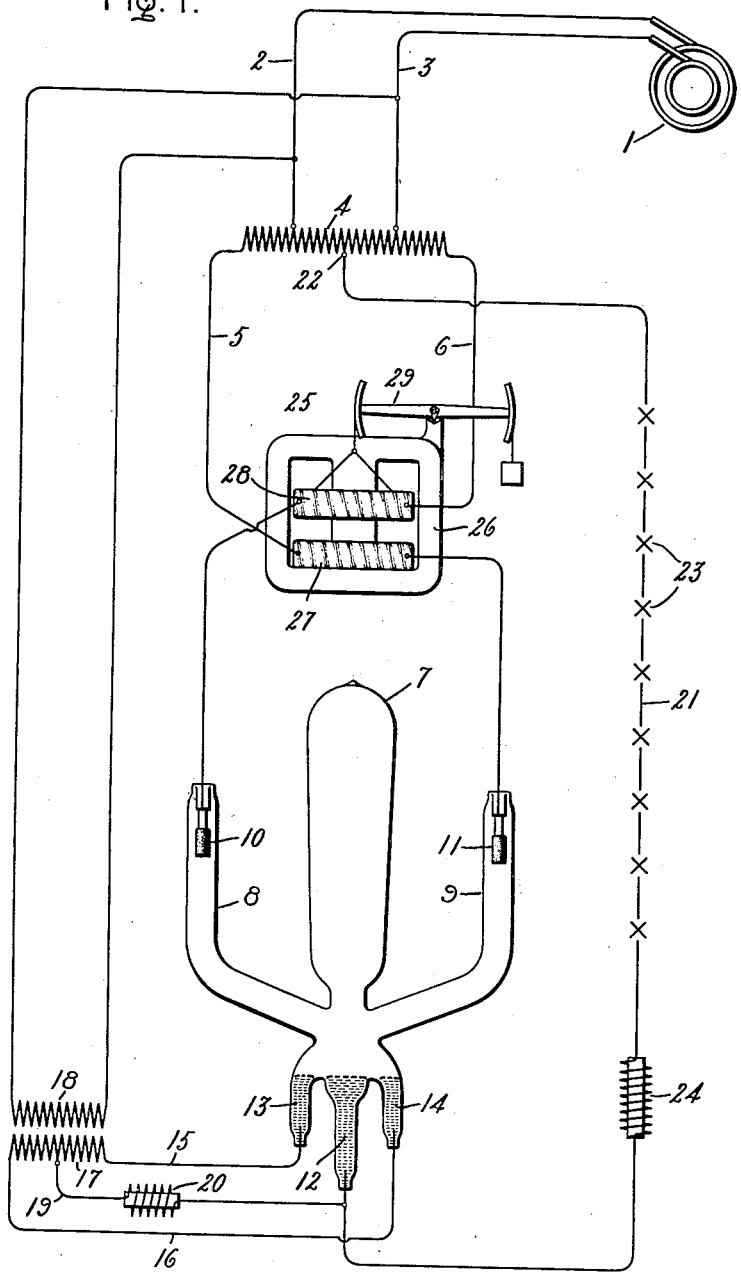
Figure 2:
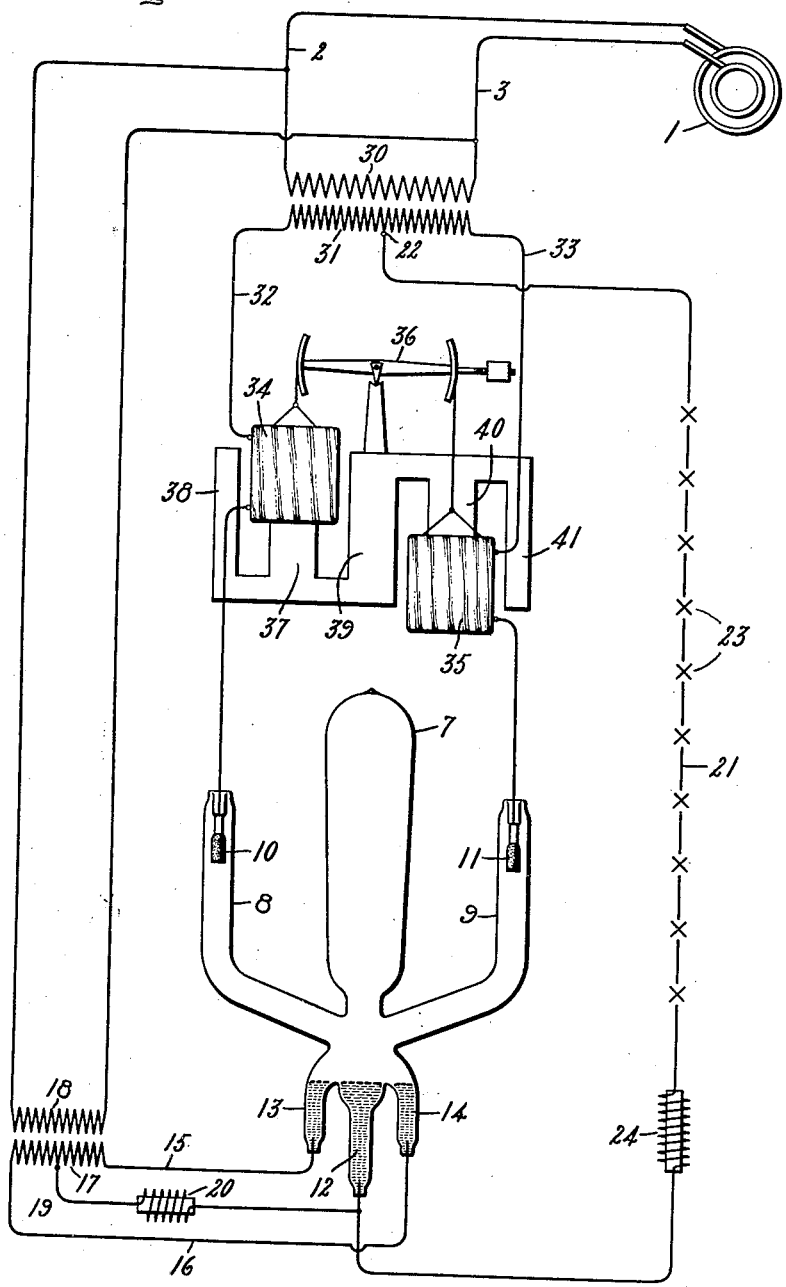

Figure 1 represents one embodiment of my invention; Fig. 2 a modification; and Fig. 3 still another modification.

In the drawings, the main source of alternating current may be of any desired character but is here represented conventionally as a single phase generator 1. Leads 2 and 3 extend therefrom and are connected to a step-up compensator 4 from the outer terminals of which extend the high voltage leads 5 and 6. The current from these leads is supplied to a vapor electric rectifier 7 of a type now well understood in the art. In the particular form shown the rectifier consists of a highly exhausted glass envelop having arms 8 and 9 carrying the main anodes 10 and 11, of graphite or other suitable material. The bottom of the receptacle is provided with adjacent pockets containing mercury electrodes 12, 13 and 14. Electrode 12 is the cathode for the main anodes 10 and 11. The electrodes 13 and 14 are starting anodes by which the apparatus is set into operation in a well understood manner. These starting anodes are connected respectively to the leads 15 and 16 of the secondary 17 of a small transformer the primary 18 of which is joined to the generator leads 2, 3. A lead 19 extending from the middle point of the secondary 17 connects with the cathode 12 and has in series with it an inductance coil 20. By shaking or tilting the rectifier, the bodies of mercury 13 and 14 may be caused to make a momentary contact with the central body of mercury 12. An arc or arcs are thus produced, which arcs, by reason of the inductance 20, overlap each other and thus are mutually sustaining. The main cathode 12 being thus excited, the main rectifier arcs from the anodes 10 and 11 to the cathode 12 are set into operation and the resulting rectified current passes in a return path through the consumption circuit 21 to the middle point 22 of the winding 4 of the supply compensator. The consumption circuit 21 may contain translating devices such as arc lamps 23 in series with each other. An inductance coil 24 serves to smooth out the current in this circuit and renders it as nearly uniform as possible, and at the same time it has the effect of prolonging the arcs to the anodes 10 and 11 so that they overlap each other and thus render the rectifier self-sustaining, even without the presence of the starting arcs. It is convenient, however, in order to provide against possible interruption of the consumption circuit, to maintain the starting arcs continuously in operation though this, however, is not essential.

I will now refer to the particular means which I employ for causing the current which I supply to the rectifier to be of constant value, which means forms a part of my present invention. In the drawings, I have represented a constant current reactance coil at 25 consisting of a three-legged core 26 of well known construction provided with a fixed coil 27 on the central leg and a movable coil 28. The movable coil is partially counterbalanced by the weighted lever arm 29. A novel manner of connecting up the apparatus is employed. One coil is connected in series with one of the leads 6, and the other coil in series with the other lead 5. This arrangement has the valuable advantage that the currents in the two leads are simultaneously and equally regulated. Thus, if the current tends to increase, the coils repel each other and by their resulting separation introduce an increased amount of inductance into the two leads, and thus check the rise of current. A balanced regulation of the currents on the two sides of the system is thereby produced which could not be accomplished either by a single regulator in one of the leads, for this would regulate but the one side, nor by two regulators, one for each side, since in this case the regulators in their efforts to maintain constancy of current would get out of step with each other and pump or oscillate violently.

In Fig. 2 I have shown a somewhat different form of regulator than that shown in Fig. 1 though in other respects the system to which the regulator is applied is substantially the same as that shown in Fig. 1. Instead, however, of using a step-up compensator 4 for raising the voltage to be supplied to the rectifier, I employ a step-up transformer having a primary 30 and a secondary 31. The leads which extend from the secondary 31 are indicated at 32 and 33, and, like the leads 5 and 6 in Fig. 1, are connected, respectively, in series with the coils of a constant current regulating device. In Fig. 2, however, the device consists of two movable coils 34 and 35 suspended from a pivoted walking beam 36. The inductance of these coils is varied by the movement of the coils into or out of good inductive relation with a fixed core. Thus the coil 34 moves so as to embrace more or less of a core member 37, the magnetic circuit of which is improved by the side members 38 and 39 located on either side of the member 37 as indicated. In a similar way the coil 35 is movable over a core member 40, the magnetic circuit of which is completed through the same member 39 already referred to, and through an outside core member 41.

It will be evident from the nature of the reactive device described that a tendency for the current to increase in either coil causes that coil to be attracted toward its corresponding core, while at the same time, the other coil, pivoted to the same supporting beam, moves toward its core. The inductance of each coil is thus equally increased and thereby causes equal regulation of the two sides of the system.

Fig. 3 represents a system consisting of the combination of two rectifier circuits in such a manner that a single return conductor serves in common for the two rectifiers. Thus in Fig. 3 a rectifier 42 is supplied with current directly from supply mains 43 of suitable voltage, and this current is regulated by a regulating device such as 44, like that shown in Fig. 2, though it is evident that any other suitable regulating means may be employed. The circuit 46 carrying the rectified current which is derived from the rectifier 42, is connected through a common return lead 47 to an intermediate point of the compensator 45, which compensator is connected across the mains 43. A similar rectifier set is indicated at the right of Fig. 3, and comprises a rectifier 48 connected across the supply mains 43 and provided with a current regulator 49 similar in character to the regulator 44. The rectified circuit 50 extending from this rectifier 48 is connected also to the same common return conductor 47 as is utilized by the rectifier 42. An inductance coil 51 is placed in the common return 47 and serves to smooth the currents flowing in both of the rectified circuits 46 and 50.

By the arrangement of rectifier sets as shown, whereby a neutral is provided for a number of rectifier systems, and whereby also a single inductance coil serves to smooth the currents of said systems, I am enabled to reduce the numbers of pieces of apparatus necessary, and thereby simplify and cheapen such systems, as well as obtain other advantages.

It is evident that various modifications may be made in the embodiment of my invention without departing from the spirit thereof, for which reason I do not wish to be limited to the precise details shown and described.

What I claim as new and desire to secure by Letters Patent of the United States, is,—

1. The combination of a source of alternating current, main conductors leading therefrom, a return conductor also leading therefrom, a vapor electric device having a plurality of anodes connected respectively to the main conductors, a cathode connected to the return conductor, and simultaneously movable current regulating coils connected respectively with the leads extending to said anodes.

2. The combination of a source of alternating current, a vapor electric device having a plurality of positive electrodes connected across said source, a common negative electrode, a consumption circuit extending from said negative electrode, and coöperating regulating devices for maintaining constancy of current flowing to said positive electrodes.

3. The combination of a source of alternating current, a vapor electric device having a plurality of positive electrodes supplied with current from said source, a common negative electrode, a return circuit from said negative electrode and coöperating constant current regulating devices for the currents flowing to said electrodes.

4. The combination of a source of alternating current, a return conductor extending therefrom, a plurality of rectifying devices supplied from said system, constant current regulating means for each rectifying device and connections whereby the rectified currents from said devices are transmitted to said return conductor.

5. The combination of a source of alternating current, means for deriving therefrom currents of constant value, rectifying devices for rectifying both polarity waves of said currents, a return condutor, and means for transmitting the combined currents of said rectifying devices to said return conductor.

In witness whereof, I have hereunto set my hand this 10th day of November, 1905.

MATTHEW O. TROY.

Witnesses:
BENJAMIN B. HULL,
BERTHA SECOR.